United States Patent Office 3,850,843
Patented Nov. 26, 1974

3,850,843
PROCESS FOR PREPARING CARBONYL
CATALYST
Taiseki Kunugi, Kaoru Fujimoto, and Hiromichi Arai, Tokyo, and Yoshihisa Watanabe, Ami, Japan, assignors to Mitsubishi Petrochemical Co., Ltd., Tokyo, Japan
No Drawing. Continuation of abandoned application Ser. No. 808,645, Mar. 19, 1969. This application Nov. 27, 1972, Ser. No. 309,814
Claims priority, application Japan, Mar. 23, 1968, 43/18,621; Mar. 14, 1969, 44/18,904
Int. Cl. C07c 45/04
U.S. Cl. 252—429 R          5 Claims

ABSTRACT OF THE DISCLOSURE

A process for the preparation of a catalyst for producing an aliphatic aldehyde or ketone of from 2 to 8 carbon atoms which comprises contacting active carbon with an aqueous solution of an acid selected from the group consisting of hydrochloric acid, hydrobromic acid, sulfuric acid, nitric acid, acetic acid, formic acid, oxalic acid, monochloroacetic acid and benzenesulfonic acid and a metal salt selected from the group consisting of chloride, bromide, iodide, fluoride, sulfate, phosphate, nitrate, cyanide, chlorate, perchlorate, formate, acetate, monochloroacetate, benzoate and naphthenate of palladium and rhodium so as to adsorb this metal salt, with the concentration of the metal salt being maintained less than the saturation concentration throughout the period of contact with active carbon.

---

This application is a continuation-in-part application of our copending application Ser. No. 808,645, filed Mar. 19, 1969, now abandoned.

This invention relates to a process for preparing catalysts for the preparation of carbonyl compounds by reacting olefinic unsaturated hydrocarbons, water and oxygen. More particularly, it relates to a process for preparing catalysts for the preparation of carbonyl compounds at high conversion and selectivity without the necessity of using a so-called re-oxidation catalyst composed of a salt of a polyvalent metal other than palladium or rhodium, which comprises activated carbon with an aqueous solution of an acid and a salt of palladium or rhodium adsorbed on the carbon.

The Hoeschst-Wacker process has heretofore been well known as a process for producing carbonyl compounds from olefins. It is well known that according to this process, palladium chloride and copper chloride are used conjointly as a catalyst, and acetaldehyde is formed from ethylene in accordance with the following formulae.

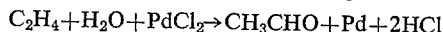
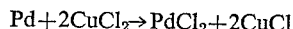
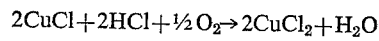

It is generally recognized that when a re-oxidation catalyst is absent in this reaction, the reaction stops at a point where palladium chloride is converted to metal palladium and only a stoichiometrical amount of acetaldehyde is formed, but that when a re-oxidation catalyst is conjointly present, metal palladium is again converted into palladium chloride and therefore, the oxidation of ethylene proceeds in a manner of a catalytic reaction. Examples of these re-oxidation catalysts include salts of polyvalent metals such as cupric chloride and ferric chloride, in particular. Usually, such a re-oxidation catalyst is used in an amount of several times to as much as 200 times the weight of palladium chloride or rhodium chloride. Since these re-oxidation catalysts are very corrosive, this restricts the material from which the reaction apparatus may be constructed. In addition, a part of the re-oxidation catalyst reacts with the olefin to yield a halide of the olefin, and therefore, it becomes necessary to supply a compound, such as hydrogen halide, during the reaction for the purpose of making up for the loss of halogen. Cupric chloride is the most typical re-oxidation catalyst. Conversion of cupric chloride into cuprous chloride results in a decrease in solubility, and inconvenience is caused because of the necessity of adding to the reaction mixture a dissolution promoting agent, such as fumaric acid and monochloroacetic acid.

In the course of studies on the nature of active carbon as a chemical active carrier in various catalytic reactions, the following surprising fact has been discovered:

A catalyst consisting of palladium chloride adsorbed onto active carbon (0.95% by weight as metal palladium; free from a re-oxidation catalyst) was packed into a tubular reactor, and a gaseous mixture of ethylene, oxygen, and water at a molar ratio of 4:1:6.5 was passed over the catalyst at 110° C. at normal atmospheric pressure. The conversion of ethylene and the selectivity of acetaldehyde were 19–21% and 90–94%, respectively, and the catalytic activity did not decrease even after the reaction had been continued for 50 hours. An amount of acetaldehyde formed over a period of 50 hours corresponded to about 2000 mols per mol of palladium chloride. Thus, it is clear that the reaction proceeded completely catalytically.

Similar experiments were conducted on various other carriers. It was found that with catalysts consisting of palladium chloride on a carrier, such as active alumina, active silica, active terra abla, diatomaceous earth, α-alumina, silica sand, titania and zirconia, the catalytic activity to oxidize ethylene becomes rapidly worse in the absence of a re-oxidation catalyst, and the formation of acetaldehyde comes to a halt within a short period of time. Speaking specifically of a palladium chloride on active alumina catalyst (0.9% by weight as metal palladium), the formation of acetaldehyde ceased completely in about 3 hours, and the catalyst which appeared red brown before the reaction turned black at the end of the three-hour reaction. A total amount of acetaldehyde formed corresponded to that of palaldium chloride supported on the carrier.

Accordingly, it was observed that in a reaction of forming carbonyl compounds by oxidation of olefins, only active carbon exhibits a remarkably different behavior from other inert porous substances usually employed as catalyst carriers. Further studies on this basis have led to the development of the present invention.

Thus, within the above environment and background, the process of the present invention was developed. Briefly, the process for preparing a catalyst for preparing an aliphatic ketone or aldehyde comprises contacting active carbon with an acid solution of a salt of palladium or rhodium so that the active carbon adsorbs this palladium or rhodium salt.

It is, therefore, the primary object of the present invention to provide a process for producing a catalyst for preparing aliphatic aldehydes and ketones.

It is a further object of the present invention to provide a catalyst produced by contacting active carbon with an acid solution of a salt of palladium or rhodium so that the active carbon adsorbs this palladium or rhodium salt.

It is a still further object of the present invention to provide a process for producing a catalyst for preparing aliphatic aldehydes and ketones comprising contacting active carbon with an aqueous solution of an acid and a salt of palladium and rhodium so as to adsorb this metal salt on the active carbon with the concentration of the metal salt being less than the saturation concentration throughout contact with the acive carbon.

Still further objects and advantages of the process for preparing the novel catalyst of the present invention will become more apparent from the following more detailed description thereof.

The foregoing objects and advantages of the present invention are achieved by way of the process for preparing a catalyst for preparing aliphatic aldehydes and ketones which comprises contacting active carbon with an aqueous solution of an acid selected from the group consisting of hydrochloric acid, hydrobromic acid, sulfuric acid, nitric acid, acetic acid, oxalic acid, monochloroacetic acid and benzenesulfonic acid and a metal salt selected from the group consisting of chloride, bromide, iodide, fluoride, sulfate, phosphate, nitrate, cyanide, chlorate, perchlorate, formate, acetate, monochloroacetate, benzoate and naphthenate of palladium and rhodium so as to absorb this metal salt, with the concentration of the metal salt being maintained less than the saturation concentration throughout the period of contact with active carbon.

In the catalyst produced in accordance with the present invention, the salt of palladium or rhodium and the active carbon cooperate with each other to form the catalyst of the invention. In other words, it appears that the active carbon is not a mere carrier, but constitutes one ingredient of the catalyst. The salt of palladium or rhodium will be referred to hereinafter as a principal catalyst ingredient.

The salt of palladium or rhodium used as the principal catalyst ingredient in the invention may be any inorganic or organic salt as long as it can be dissolved into an aqueous solution of an acid. Specific examples include inorganic acid salts such as palladium chloride, palladium bromide, palladium iodide, palladium fluoride, palladium sulfate, palladium phosphate, palladium nitrate, palladium cyanide, palladium chlorate, and palladium perchlorate; organic acid salts of palladium such as palladium formate, palladium acetate, palladium monochloroacetate, palladium benzoate, palladium oxalate, and palladium naphthenate; and complex salts such as palladium-amine complex. Especially preferable among them are palladium chloride and palladium sulfate. As the rhodium salt, salts of the same inorganic acids or organic acids or complexes are used, and rhodium chloride and rhodium sulfate are most preferred.

The catalyst of the present invention is prepared by dissolving a suitable amount of the palladium salt or rhodium salt in an aqueous solution of an acid, and contacting active carbon with an acid aqueous solution of the palladium or rhodium salt whereby the palladium salt or rhodium salt is adsorbed onto the active carbon. The aqueous solution of an acid used at this time may be any aqueous solution of an acid capable of dissolving the palladium salt or rhodium salt added. In order to obtain a catalyst of high activity which gives a high conversion of olefins, it is preferable that the palladium or rhodium salt should be added to an aqueous acid solution so that R of the following formula is at least 4, preferably at least 5, $$R = (m \cdot n + p \cdot q)/a$$

wherein $m$ is the mol number of the palladium salt or rhodium salt to be dissolved, $n$ is the number of electric charge of the acid radical of the salt, $p$ is the mol number of the acid in the acid aqueous solution to be used to dissolve the palladium salt or rhodium salt, $q$ is the number of electric charge of the acid radical of the acid, $a$ is the mol number of said palladium salt or rhodium salt, and active carbon is contacted with the obtained acid aqueous solution of the palladium salt or rhodium salt.

Preferred aqueous solutions of acids for dissolving the palladium salt or rhodium salt are aqueous solutions of inorganic acids such as hydrochloric acid, hydrobromic acid, sulfuric acid and nitric acid and aqueous solutions of organic acids such as acetic acid, formic acid, oxalic acid, monhloroacetic acid and benzenesulfonic acid. Concentrations of acids in these aqueous acid solutions may vary from acid to acid, but with regard to hydrochloric acid, it is preferred that the concentration should be not more than 2 N, and the above-mentioned R should be at least 4, preferably at least 5. If the concentration of hydrochloric acid exceeds 2 N and increases further, it becomes gradually difficult for the dissolved palladium salt to be adsorbed onto active carbon. Concentrations of other acids in the aqueous acid solutions may be readily determined experimentally.

The concentration of the palladium salt or rhodium salt to be dissolved in the aqueous solution of acid should be within a range below the saturation concentration and also preferably should be relatively dilute. Generally, it is preferable that the concentration of the salt in the acid aqueous solution should be about 0.1 to 5% by weight.

The catalyst of the present invention may be prepared by contacting the acid aqueous solution of palladium salt or rhodium salt with active carbon to thereby cause the active carbon to adsorb the palladium salt or rhodium salt. To cause the palladium salt or rhodium salt to be adsorbed onto active carbon, the following procedures may be employed.

(a) A solution of a necessary amount of a palladium salt or rhodium salt is placed in a vessel, and a predetermined amount of active carbon, which has been deaerated by boiling with water, is added to the salt and the mixture is allowed to stand. To make the adsorption uniform, it is preferable to stir the solution and the active carbon continuously or occasionally. When the color of the solution disappears or there is substantially no change of color, the active carbon is separated from the solution. It is washed with water or a dilute aqueous solution, and dried.

(b) Active carbon is put into a closed vessel, and the vessel is evacuated to deaerate the active carbon sufficiently. A solution of a necessary amount of palladium salt or rhodium salt is then introduced into the deaerated vessel, and contacted with the active carbon. The salt is sufficiently adsorbed onto the active carbon in the same manner as in (a). The active carbon is then separated, washed, and dried.

(c) A solution of a palladium salt or rhodium salt is circulated in an adsorbing vessel packed with active carbon, and contacted with the carbon therein.

In any of the procedures (a), (b) and (c), the concentration of the palladium salt or rhodium salt should be less than the saturation concentration throughout the period of contact with the active carbon. If the concentration is above the saturation concentration, crystallization or sedimentation of the salt occurs in addition to adsorption when the solution is contacted with active carbon. Thus, a uniformly distributed adsorption of the salt onto the surface of active carbon cannot be achieved, and the activity of the resulting catalyst becomes low.

Adsorption by heating is often employed since the saturation concentration of the salt is raised by heating, and a catalyst having a uniformly dispersed metal salt is obtained. It should, however, be noted that care must be taken not to cause precipitation and sedimentation of the salt by evaporation and concentration of the solution.

If unadsorbed salt remains in the solution at the time of the separation of active carbon after adsorption, subsequent drying causes the precipitation of such unadsorbed salt. It is preferable therefore to wash the separated active carbon thoroughly with water or an acid aqueous solution.

Catalysts obtained by adsorbing a palladium salt or rhodium salt onto powdery active carbon by the above-mentioned method and then compression-molding it can give the same activity and selectivity as the catalysts obtained in accordance with the above-mentioned procedure.

Thus, in the preparation of the catalyst of the invention, it is necessary to cause a palladium salt or rhodium salt to be adsorbed onto active carbon as uniformly as possible. It is preferable to avoid as much as possible a method by which active carbon is immersed in a solution of a palladium or rhodium salt and is then subjected to such a treatment as evaporation to dryness to deposit the palladium salt or rhodium salt forcibly onto the active carbon. If such a method is employed, the obtained catalyst must be sufficiently heated with an acid aqueous solution, and the palladium salt or rhodium salt deposited on the active catalyst must be either removed or readsorbed, in order that a greater part of the palladium salt or rhodium salt remaining on the active carbon may be uniformly adsorbed onto the active carbon. An amount of the palladium salt or rhodium salt to be adsorbed onto the active carbon should preferably be such that an amount of the sedimented material may be as small as possible, and usually be about 0.3–10% by weight calculated as metal palladium or metal rhodium based on the active carbon. Unexpectedly, it has been found that as the amount of the palladium salt or rhodium salt to be supported or adsorbed on active carbon is reduced, the conversion of olefin becomes higher, and good results are obtained when such salt is supported or adsorbed on active carbon in an amount, calculated as metal palladium or metal rhodium, of 0.5 to 5.0% by weight, and preferably from 0.6–4.0% by weight. The fact that the catalyst of the invention oxidizes olefins at high conversions when an amount of the palladium salt or rhodium salt to be supported or adsorbed on active carbon is very small, and that it can give the corresponding carbonyl compounds at very high selectivity clearly indicates that the catalyst of the invention exhibits quite a different behavior from other catalysts of this kind.

As mentioned above, highly active catalysts for oxidizing olefins can be obtained merely by supporting a palladium salt and/or rhodium salt alone on active carbon in accordance with the adsorption method. It is, however, possible to employ at the same time a salt of a metal of the platinum group in Group VIII of the periodic table, such as ruthenium, iridium and platinum in an amount less than about 30% by weight calculated as the metal based on the palladium or rhodium. Furthermore, it has been separately confirmed that even when less than 30% by weight of a halide of an alkali metal such as sodium potassium and lithium is also supported in an amount of less than 30% by weight calculated as the metal based on the palladium or rhodium, no particular trouble occurs. Cupric salt or ferric salt usually used as a reoxidation catalyst may also be supported in a small amount, but no particular benefit can be obtained from this salt. The catalyst of the invention, therefore, does not exclude one in which a small amount of other metal salt mentioned above is further adsorbed together with a palladium salt and/or rhodium salt.

The active carbon used in the invention may be any active carbon commercially available. Preferred active carbon has a surface area of at least 300 m.²/g., particularly at least 500 m.²/g. which has been activated with water vapor, air, carbon dioxide gas, or combustion waste gas, particularly, water vapor. Other methods of activating carbon with an inorganic chloride, such as zinc chloride and calcium chloride, have also been known, but according to research work, catalysts containing carbons activated with such inorganic chlorides do not appear to give a desirable conversion of olefins. The material for active carbon may be of any kind such as a palm shell, timber fragments and coal.

The production of aliphatic aldehydes and ketones with the catalyst of the present invention comprises contacting monoolefin having 2 to 8 carbon atoms, molecular oxygen and water with the catalyst of the present invention at a temperature in the range of 50 to 180° C. The starting aliphatic monoolefin having 2 to 8 carbon atoms may be of straight chain or have a side chain, and includes, for example, ethylene, propylene, n-butene-1, n-butene-2, n-hexene-1, cyclohexene, and octane-1. Among them, ethylene, propylene, n-butene-1, and n-butene-2 are particularly preferable starting materials. The corresponding carbonyl compounds may be obtained as principal products from these olefins. For instance, acetaldehyde is obtained from ethylene; acetone, from propylene; and methyl ethyl ketone, from n-butene-1 and n-butene-2. The proportion of the aliphatic monoolefin, molecular oxygen and water to be fed in the present invention into the reaction system packed with a catalyst should preferably be 1:0.5–0.4:0.25–5 in terms of molar ratio. It is necessary that the mixture of the olefin, molecular oxygen and water be contacted in a gaseous state with the catalyst within this range of proportion and also at a temperature higher than the dew point of water vapor. Even when the proportion of the olefin, molecular oxygen and water is within the above specified range, care need be taken not to induce explosion during the reaction. Thus, the proportion of these three materials and/or reaction apparatus and operational conditions must be selected with care. When ethylene is specifically used as the material, the molar ratio of ethylene, molecular oxygen and water should preferably be 1:0.20–0.35:0.7–3.0. The molecular oxygen may be a gas containing molecular oxygen, such as air, and when such a gas is used, the above molar ratio may be calculated on the basis of the molecular oxygen contained in the gas. Also, the mixture of olefin, molecular oxygen and water may be diluted with an inert gas such as carbon dioxide gas, methane, ethane and nitrogen before contact with the catalyst.

The gaseous mixture mentioned above is contacted with the catalyst at a temperature in the range of from 50° to 180° C., preferably from 70° to 150° C. Generally, in the reaction of the invention, the conversion of olefin becomes too low when the reaction temperature is lower than 50° C. or exceeds 180° C. In this sense, the range of 70° to 150° C. particularly gives a desirable conversion of olefin. Contact between the starting gaseous mixture and the catalyst may preferably be effected for 2 to 30 seconds, particularly 5 to 20 seconds.

The reaction using the catalyst of the present invention may be carried out either at normal atmospheric pressure or at elevated pressures. Reaction under elevated pressures is advantageous in that it increases the rate of reaction. If the pressure is too high, it becomes difficult to remove heat in the catalyst bed and there is an increasing formation of butene because of dimerization. Therefore, it is usually preferable to effect the reaction at a pressure not in excess of 30 atmospheres, preferably not higher than 20 atmospheres.

Thus, by using the catalyst of the present invention, the need for using re-oxidation catalyst salts of polyvalent metals such as cupric chloride and ferric chloride, which were previously considered indispensable is obviated. Instead, it is possible to produce carbonyl compounds from olefins at high selectivity by oxidizing the olefins at high conversion with the use of a catalyst comprising a palladium salt or rhodium salt either alone or conjointly adsorbed onto active carbon while maintaining a high catalyst activity for a long time. For instance, speaking of ethylene, acetaldehyde is obtained at a one-pass yield of about 20 to 50%. Furthermore, corrosion of the reaction apparatus is avoided because a re-oxidation catalyst need not be used. Also, by-products such as olefin halides, are minimized, and even if palladium chloride is used as a principal catalyst, there is no need to supply hydrogen chloride to the reaction system during the reaction.

The invention will further be described with reference to the following examples.

EXAMPLE 1

10.2 grams of granular active carbon prepared from palm shell by the water vapor activating method (having a particle diameter of 2–3 mm. and a surface area of 1220 m.$^2$/g.) were thoroughly deaired *in vacuo*, and a solution of 0.37 g. (corresponding to 2.18% by weight calculated as metal palladium based on the active carbon) of palladium chloride in 100 cc. of 1 N hydrochloric acid (the atomic ratio R of Cl/Pd in the solution being 40) was poured onto the active carbon. It was allowed to stand for 20 hours at a temperature of 20 to 25° C. The solution became transparent, and it was confirmed that all of the palladium chloride in the solution had been adsorbed onto the active carbon. Hydrochloric acid was removed by filtration, and the deposited hydrochloric acid was removed by a centrifugal separator. The so treated active carbon was dried for 5 hours at 130° C. at a reduced pressure of about 20 mm. Hg.

The so prepared catalyst was packed into a vertical glass tubular reactor of the fixed bed type adapted to be heated electrically, and a gaseous feed mixture of ethylene, oxygen and water at a molar ratio of 3:1:9 was flowed thereinto at a temperature of 100±2° C. for a contact time of 12±0.4 seconds. Formation of acetaldehyde began immediately after initiation of the reaction, and a stationary state was attained in 4 hours. The operation was continued for 50 hours. The results are shown in Table 1 below.

TABLE 1

| Time that elapsed (hour) | Conversion of ethylene (mol percent) | Selectivity of acetaldehyde (mol percent) |
| --- | --- | --- |
| 1.5 | 17.1 | ---- |
| 2.0 | 25.2 | 91.3 |
| 3.0 | 40.9 | 94.7 |
| 5.0 | 43.1 | 98.2 |
| 10.0 | 42.3 | 99.3 |
| 20.0 | 41.8 | 97.9 |
| 30.0 | 43.5 | 98.7 |
| 40.0 | 42.7 | 99.1 |
| 50.0 | 42.1 | 98.4 |

EXAMPLE 2

Ten grams of granular active carbon prepared from sawdust of wood by the water vapor activating method (having a particle diameter of 2–3 mm. and a surface area of 1280 m.$^2$/g.) were thoroughly deaired *in vacuo*, and a solution of 0.25 g. (corresponding to 1.5% by weight calculated as metal palladium based on the active carbon) of palladium chloride in 90 cc. of 0.5 N hydrochloric acid (R being 32.1) was poured onto the active carbon. The solution was slowly stirred for 24 hours at a temperature of 15 to 20° C. The solution became transparent, and it was confirmed that all of the palladium chloride had been adsorbed onto the active carbon. Hydrochloric acid was removed by filtration, and the active carbon was quickly washed with 100 cc. of distilled water, followed by drying for 6 hours at 150° C. at a reduced pressure of about 30 mm. Hg.

The so prepared catalyst was packed into the same reactor as used in Example 1, and a gaseous feed mixture of propylene, air and water at a molar ratio of 1:1:2 was flowed thereinto at a temperature of 103° C. for a contact time of 14.3 seconds. It was found that the one-pass yield (based on the propylene) of acetone in a stationary state was 20.3 mol percent and the selectivity of acetone was 91.0 mol percent.

EXAMPLE 3

In a 150 ml. round-bottomed flask provided with a reflux condenser, 0.32 g. (corresponding to 1.92% by weight calculated as metal palladium based on the active carbon) of palladium chloride was dissolved in 60 cc. of 0.2 N hydrochloric acid (R being 8.7). Ten grams of granular active carbon prepared from coal by the air activating method (having a particle diameter of 2–3 mm. and a surface area of 925 m.$^2$/g.), which had previously been boiled with hot water, were poured into the solution, followed by allowing the system to stand at a temperature of 70–80° C. until there was no coloration of palladium chloride. Hydrochloric acid was removed by filtration, and the active carbon was washed with 70 cc. of distilled water. Thereafter, the active carbon was dried for 5 hours at 140° C. at a reduced pressure of about 25 mm. Hg.

The so prepared catalyst was packed into the same reactor as used in Example 1, and a gaseous feed mixture of ethylene, oxygen, and water was flowed at 105° C. at normal atmospheric pressure for a contact time of 8.6 seconds. It was found that the one-pass yield (based on the ethylene) of acetaldehyde in a stationary state was 31.3 mol percent.

EXAMPLE 4

Ten grams of granular active carbon prepared from sawdust of wood and activated with zinc chloride (having a particle diameter of 1–2 mm. and a surface area of 1400 m.$^2$/g.) were deaired *in vacuo*, and a solution of 0.25 g. (corresponding to 1.5% by weight calculated as metal palladium based on the active carbon) of palladium chloride in 90 cc. of 0.5 N hydrochloric acid (R being 32.1) was poured onto the active carbon. The solution was slowly stirred at a temperature of 15–20° C. for 24 hours. The solution became transparent, and it was confirmed that all of the palladium chloride had been adsorbed onto the active carbon. Hydrochloric acid was separated by filtration, and the active carbon was quickly washed with 70 cc. of distilled water, followed by drying for 6 hours at 150° C. and a reduced pressure of about 30 mm. Hg.

The so prepared catalyst was packed into the same reactor as used in Example 1, and a gaseous feed mixture consisting of ethylene, oxygen and water at a molar ratio of 4:1:5.5 was flowed at 103° C. at normal atmospheric pressure for a contact time of 10.6 seconds. It was found that the one-pass yield (based on the ethylene) of acetaldehyde in a stationary state was 4.6 mol percent.

EXAMPLE 5

Ten grams of granular active carbon prepared from palm shell by the water vapor activating method (having a particle diameter of 3–4 mm. and a surface area of 1220 m.$^2$/g.), which had been previously boiled with hot water, were poured into a solution of 0.16 g. (corresponding to 0.96% by weight calculated as metal palladium based on the active carbon) of palladium chloride in 50 cc. of 0.5 N hydrochloric acid (R being 27.7). The solution was allowed to stand for 20 hours at 15–25° C. The solution became transparent, and it was confirmed that all of the palladium chloride had been adsorbed onto the active carbon. Hydrochloric acid was separated by filtration, and the active carbon was washed with 70 cc. of distilled water, followed by drying for 6 hours at 150° C. at a reduced pressure of about 25 mm. Hg.

The so prepared catalyst was packed into the same reactor as used in Example 1, and a gaseous feed mixture of ethylene, oxygen and water vapor at the molar ratios indicated in Table 2 was reacted at the temperature indicated in Table 2. The one-pass yield of acetaldehyde in a stationary state was as shown in Table 2.

TABLE 2

| Reaction temperature (° C.) | Proportion of starting materials [1] | Yield of acetaldehyde (mol percent) |
|---|---|---|
| 220 | 1:0.25:3.0 | 1.6 |
| 200 | 1:0.25:3.0 | 2.4 |
| 180 | 1:0.25:3.0 | 4.4 |
| 170 | 1:0.25:3.0 | 6.2 |
| 150 | 1:0.25:3.0 | 10.2 |
| 120 | 1:0.25:3.0 | 20.2 |
| 100 | 1:0.4:2.4 | 40.1 |
| 95 | 1:0.25:3.0 | 41.5 |
| 85 | 1:0.25:1.25 | 29.5 |
| 70 | 1:0.25:0.50 | 20.4 |
| 60 | 1:0.25:0.25 | 12.5 |
| 45 | 1:0.25:0.13 | 6.7 |
| 30 | 1:0.25:0.05 | 2.1 |

[1] Molar ratio of ethylene, oxygen and water vapor.

EXAMPLE 6

Ten grams of granular active carbon prepared from charcoal by the water vapor activating method (having a particle diameter of 3–4 mm. and a surface area of 1140 m.$^2$/g.), which had been boiled with water, were poured into a solution of 0.43 g. of rhodium chloride in 90 cc. of 0.3 N hydrochloric acid (R being 13.5). The solution was then allowed to stand for 24 hours at room temperature. The solution became transparent, and it was confirmed that all of the rhodium chloride had been adsorbed onto the active carbon. Hydrochloric acid was separated by filtration, and the active carbon was washed with 100 cc. of distilled water and dried. Thereafter, the active carbon was deaired and dried for 6 hours at 150° C. at a reduced pressure of about 25 mm. Hg.

This catalyst was packed into the same reactor as used in Example 1, and a gaseous feed mixture consisting of ethylene, air and water vapor at a molar ratio of 4:6:6 was flowed thereinto at normal atmospheric pressure for a contact time of about 11 seconds at the temperature indicated in Table 3. It was found that the one-pass yield (based on the ethylene) of acetaldehyde in a stationary state was as shown in Table 3 below.

TABLE 3

| Reaction temperature (° C.) | Yield of acetaldehyde (mol percent) |
|---|---|
| 120 | 32.7 |
| 130 | 23.1 |
| 150 | 14.5 |

EXAMPLE 7

A palladium sulfate/active carbon catalyst was prepared in the same manner as in Example 5 with the use of a solution of 0.16 g. of palladium sulfate in 80 cc. of 1 N sulfuric acid (R, i.e. 2×SO$_4$$^{--}$/Pd, being 100) and 10 g. of the palm shell active carbon used in Example 5. This catalyst was packed into the same reactor as used in Example 1, and a gaseous feed mixture consisting of ethylene, oxygen and water vapor at a molar ratio of 1:0.25:3 was flowed thereinto at atomspheric pressure for a contact time of about 13 seconds at the temperature indicated in Table 4 below. It was found that the one-pass yield (based on the ethylene) of acetaldehyde in a stationary state was as shown in Table 4.

TABLE 4

| Reaction temperature (° C.) | Yield of acetaldehyde (mol percent) |
|---|---|
| 120 | 29.8 |
| 140 | 24.2 |
| 160 | 15.3 |

EXAMPLE 8

A predetermined amount of a metal salt was adsorbed onto the same active carbon as used in Example 1 in the same manner as in Example 1 from (I) a solution of palladium nitrate in nitric acid, (II) a solution of rhodium chloride in hydrochloric acid, (III) a solution of palladium chloride and rhodium sulfate in hydrochloric acid, or (IV) a solution of palladium chloride and ruthenium chloride to produce a metal salt/active carbon catalyst. The reaction is conducted under various conditions with respect to each catalyst obtained. The proportion of reactants, reaction conditions and the obtained results are shown in Table 5 below.

TABLE 5

| Metal salt and amount thereof supported (wt. percent) | Reaction conditions | | | Proportion of reactants in gaseous mixture (molar ratio) | Conversion (mol percent) | Selectivity (mol percent) |
| | Temperature (° C.) | Pressure (atoms) | Contact time (second) | | | |
|---|---|---|---|---|---|---|
| (I) Pd(NO$_3$)$_2$, 2.2 | 115 | 3.2* | 9.8 | N-butene-1:air:water 1:2:6 | 16.6 | Methylethyl ketone, 93.4; butyl aldehyde, 4.0. |
| (II) RhCl$_2$, 5.1 | 130 | Normal atmospheric pressure. | 14.6 | Ethylene:ethane:oxygen:carbon dioxide:water 1:0.33:0.34:0.47:20 | 19.6 | Acetaldehyde, 98.4. |
| (III) RhCl$_2$, 2.2 | 135 | do | 7.2 | Ethylene:oxygen:water 4.1:1:10 | 8.2 | Acetaldehyde, 98.5. |
| (IV) PdSO$_4$, 1.8; RhCl$_2$, 1.1 | 100 | do | 9.8 | Ethylene:oxygen:water 4:11.1:1 | 24.4 | Acetaldehyde, 93.6. |
| (V) PdCl$_2$, 2.7; RuCl$_2$, 0.3; IrCl$_2$, 0.1. | 130 | do | 14.2 | Ethylene:oxygen:water 1:0.25:3 | 27.1 | Acetaldehyde, 89.3. |

* A stainless steel reactor was used.

EXAMPLE 9

In the same manner as in Example 8, a predetermined amount of a metal salt was adsorbed onto an active carbon from (I) a solution of palladium acetate in acetic acid or (II) a solution of palladium chloride in hydrochloric acid to produce a metal salt/active carbon catalyst. Reaction was carried out using the so prepared catalyst and the results shown in Table 6 were obtained.

TABLE 6

| Metal salt and amount thereof supported (wt. percent) | Reaction conditions | | | Porportion of reactants in gaseous mixture (molar ratio) | Conversion (mol percent) | Selectivity (mol percent) |
| | Temperature (° C.) | Pressure (atoms) | Contact time (second) | | | |
|---|---|---|---|---|---|---|
| (I) Pd(CH$_3$CH)$_2$, 2.1 | 120 | 2.7* | 11 | Ethylene:n-butene-2:oxygen:water 1:0.7:0.5:8 | Ethylene, 21.9; n-butene-2, 10.3. | Acetaldehyde, 98.3; methylethyl ketone, 91.5. |
| (II) PdCl$_2$, 0.37 | 135 | Normal atmospheric pressure. | 14.3 | 6-methylheptene-1:oxygen:water 10.3:2.2 | 7.7 | Methylisohexyl ketone, 93.9. |

* A stainless steel reactor was used.

EXAMPLE 10

A catalyst was prepared in the same manner as in Example 5 using a solution of 0.16 g. of palladium chloride in a mixture of 30 cc. of 0.5 N hydrochloric acid and 30 cc. of sulfuric acid (R, i.e. $(Cl^-+2\times SO_4^{--})/Pd$, being 3.3] and 10 g. of the same active carbon as used in Example 5.

The so prepared catalyst was packed into the same reactor as used in Example 1, and a gaseous feed mixture consisting of ethylene, oxygen and water vapor at a molar ratio of 1:0.25:3 at 100° C. at atmospheric pressure for a contact time of 10.3 seconds. It was found that the one-pass yield (based on the ethylene) of acetaldehyde in a stationary state was 31.4 mol percent.

EXAMPLE 11

A catalyst was prepared by supporting a solution of 1.8% by weight of palladium bromide in 0.5 N hydrogen bromide on granular active carbon prepared from wood by the air activating method (having a surface area of 990 m.²/g.). The so prepared catalyst was packed into the same reactor as used in Example 1, and a gaseous mixture consisting of ethylene, oxygen and water at a molar ratio of 3.2:1:9.7 was flowed at 100° C. at normal atmospheric pressure for a contact time of 9.4 seconds. It was found that the conversion of ethylene was 8.8 mol percent, and the selectivity of acetaldehyde was 98.7 mol percent.

EXAMPLE 12

A palladium chloride/active carbon catalyst was prepared in the same manner as in Example 1 using a solution with a concentration of 0.5% by weight of 0.1 to 3% by weight, calculated as metal palladium based on 10 g. of the active carbon, of palladium chloride in 0.5 N hydrochloric acid, and 10 g. of active carbon prepared from coal by the water vapor activating method (having a particle diameter of 2–3 mm. and a surface area of 1070 m.²/g.). Catalysts containing 4.57% by weight and 8.37% by weight, calculated as metal palladium, of palladium chloride were prepared in the following manner.

Catalyst containing 4.57% by weight of palladium chloride

Ten grams of the above-mentioned active carbon were boiled in distilled water, and placed into a solution of 0.8 g. of palladium chloride in 160 cc. of 0.5 N hydrochloric acid. It was allowed to stand for 24 hours at room temperature. Hydrochloric acid was separated by filtration, and the active carbon was washed three times with 100 cc. of distilled water. Liberation of palladium chloride from the active carbon was not seen at this time. Thereafter, the active carbon was dried for 5 hours at 150° C. at a reduced pressure of about 20 mm. Hg. Thus, a catalyst comprising 4.57 wt. percent palladium chloride on active carbon was obtained.

Catalyst containing 8.37% by weight of palladium chloride

Ten grams of the above-mentioned active carbon were boiled with water, and packed into a glass column. A solution of 1.6 g. of palladium chloride in 320 cc. of 0.5 N hydrochloric acid was circulated into the active carbon over a period of 20 hours to thereby adsorb the palladium chloride onto the active carbon. Thereafter, 300 cc. of distilled water were introduced thereinto and circulated to wash it, followed by drying for 5 hours at 150° C. at a reduced pressure of about 20 mm. Hg. Thus, a palladium chloride/active carbon catalyst containing 8.37% by weight of palladium chloride adsorbed onto the active carbon was obtained.

Each of these catalysts was packed into the same reactor as used in Example 1, and a gaseous feed mixture consisting of ethylene, oxygen, and water vapor at a molar ratio of 4:1:6 at 110° C. at atmospheric pressure was passed therewith for a contact time of 6.6 seconds. The results are shown in Table 7.

TABLE 7

| Amount of palladium chloride absorbed (percent by weight calculated as metal palladium) | Yield of acetaldehyde (mol percent based on ethylene) |
|---|---|
| 0.1 | 0.6 |
| 0.2 | 4.3 |
| 0.5 | 15.7 |
| 1.0 | 23.6 |
| 2.0 | 28.4 |
| 4.57 | 17.1 |
| 8.37 | 13.6 |

EXAMPLE 13

A palladium chloride/active carbon catalyst was prepared in the same manner as in Example 1 using a solution of 0.5% by weight, calculated as metal palladium, of palladium chloride in 60 cc. of hydrochloric acid of various concentrations and 10 g. of active carbon prepared from wood by the water vapor activating method (having a particle diameter of 2.5–3.5 mm. and a surface area of 1280 m.²/g.).

Each of the obtained catalysts was packed into the same reactor as used in Example 1, and a gaseous feed mixture consisting of ethylene, oxygene and water vapor at a molar ratio of 4:1:6 was flowed thereinto at a reaction temperature of 100° C. for a contact time of 9.7 seconds. The results obtained are shown in Table 8.

TABLE 8

| Concentration of hydrochloric acid (N) | Cl/Pd in the solution (R) | Yield of acetaldehyde (percent) |
|---|---|---|
| 0.004 (note 1) | 2.3 | 0.4 |
| 0.023 (note 2) | 4.0 | 6.7 |
| 0.046 | 6.0 | 16.3 |
| 0.10 | 13 | 15.8 |
| 0.50 | 64 | 16.5 |
| 1.00 | 128 | 15.6 |
| 3.00 (note 2) | 394 | 9.1 |
| 5.3 (note 2) | 702 | 5.8 |

NOTE 1. As the solubility of palladium chloride in 0.004 N and 0.023 N hydrochloric acid is low, the dissolved palladium chloride is partly adsorbed onto the active carbon, and partly reduced to metal palladium which is precipitated onto the active carbon.

NOTE 2. Since palladium chloride was not completely adsorbed when the concentration of hydrochloric acid was 3.00 N and 5.3 N, the solution and the active carbon were transferred onto an evaporating dish after the same treatment as Example 1, and evaporated to dryness at 120° C., whereby all of the palladium chloride remaining in the solution was forcibly supported on the active carbon.

COMPARATIVE EXAMPLE 1

Palladium chloride (8.33 g.), 5.5 cc. of concentrated hydrochloric acid and 40 cc. of water were heated over a water bath to prepare a solution of palladium chloride. The so prepared solution was poured onto a solution of 135 g. of sodium acetate trihydrate in 500 cc. of water. Forty-five grams of an active carbon were put into the solution prepared in the manner mentioned above. This mixture was reduced with hydrogen until there was no adsorption of hydrogen after 1–2 hours. (Method according to Example D, page 78, vol. 26, "Organic Synthesis.")

The so prepared catalyst was allowed to stand in air, and then packed into the same reactor as used in Example 1. A gaseous feed mixture consisting of ethylene, oxygen and water at a molar ratio of 4:1:6 was passed thereinto at 60° C. at normal atmospheric pressure for a contact time 8.7 seconds. The results obtained after one pass are shown in Table 9.

TABLE 9

| | |
|---|---|
| Reaction temperature (° C.) | 60 |
| Conversion of ethylene (mol percent) | 1.46 |
| Yield of acetaldehyde (mol percent) | 0.49 |

It is seen from the foregoing result that the effect of the present invention cannot be obtained with a catalyst prepared in accordance with the method in Example D of Organic Synthesis.

COMPARATIVE EXAMPLE 2

Ten grams of the same granular active carbon as obtained in Example 1 were added to a solution of 0.8 g. of palladium chloride and 0.9 g. of calcium carbonate in 100 ml. of 1 N dilute hydrochloric acid, and the mixture was evaporated to dryness at 120° C. Five grams of the obtained catalyst (amount of metal palladium supported being 4.1% by weight) were packed into the same reactor as in Example 1, and a gaseous feed mixture consisting of propylene, oxygen and water at a molar ratio of 61:21:18 was flowed at 61° C. at normal atmospheric pressure for a contact time of 12 seconds. It was found that the conversion of propylene was 4.7 mol. percent, and the selectivity of acetone was 94.7 mol. percent.

It is seen from the foregoing result that propylene cannot be oxidized at high conversion with a catalyst obtained by adding a large amount of calcium carbonate and by evaporation to dryness.

What is claimed is:

1. A process for the preparation of a catalyst for producing an aliphatic aldehyde or aliphatic ketone of 2 to 8 carbon atoms, which comprises contacting active carbon with an aqueous solution of an acid selected from the group consisting of hydrochloric acid, hydrobromic acid, sulfuric acid, nitric acid, acetic acid, formic acid, oxalic acid, monochloroacetic acid and benzene sulfonic acid and a metal salt selected from the group consisting of chloride, bromide, iodide, fluoride, sulfate, phosphate, nitrate, cyanide, chlorate, perchlorate, formate, acetate, monochloroacetate, benzoate and naphthenate of at least one platinum metal selected from the group consisting of palladium and rhodium so as to adsorb said metal salt thereon, wherein said aqueous acid solution is a solution of said salt of said platinum metal dissolved in an aqueous solution of an acid so that atomic ratio R expressed by the following formula $$R = (m \cdot n + p \cdot q)/a$$

wherein $m$ is the mol number of said salt of palladium or salt of rhodium to be dissolved, $n$ is the number of electric charge of the acid radical of said salt of palladium or salt of rhodium, $p$ is the mol number of the acid in the aqueous acid solution dissolving said salt of palladium or salt of rhodium, $q$ is the number of the electric charge of the acid radical of said acid, and, $a$ is the mol number of said salt of palladium or salt of rhodium, is at least 4, the concentration of said salt being maintained less than the saturation concentration throughout the period of contact with active carbon.

2. The process of claim 1 wherein said metal salt is selected from the group consisting of chloride, bromide, sulfate, nitrate and acetate.

3. The process of claim 1 wherein said catalyst is prepared by contacting active carbon with an acid solution of said salt of said platinum metal dissolved at a concentration lower than the saturation concentration in an aqueous solution of an acid so that R is at least 5, thereby causing said salt of said platinum metal to be adsorbed onto said active carbon without precipitation, followed by washing said active carbon with water or an aqueous acid solution and then drying said washed active carbon.

4. The process of claim 1 wherein said acid is selected from the group consisting of hydrochloric acid, hydrobromic acid, sulfuric acid, nitric acid and acetic acid.

5. The catalyst produced by the process of claim 1.

References Cited

UNITED STATES PATENTS

| 3,131,223 | 4/1964 | Smidt et al. | 252—428 X |
| 3,384,669 | 5/1968 | MacLean et al. | 252—438 X |
| 3,641,121 | 2/1972 | Swift | 252—441 X |

OTHER REFERENCES

Organic Synthesis, vol. 26, pp. 77–82, "Palladium Catalysts."

PATRICK P. GARVIN, Primary Examiner

U.S. Cl. X.R.

252—428, 437, 438, 440, 441; 260—597 B, 604 AC